United States Patent [19]
Schuller et al.

[11] 3,926,482
[45] Dec. 16, 1975

[54] FLUID JOURNAL BEARINGS

[75] Inventors: Frederick T. Schuller; Warren A. Moore, both of Cleveland, Ohio

[73] Assignee: The United States of America as represented by the United States National Aeronautics and Space Administration Office of General Counsel-Code GP, Washington, D.C.

[22] Filed: Feb. 25, 1974

[21] Appl. No.: 445,178

Related U.S. Application Data

[62] Division of Ser. No. 346,483, March 30, 1973, Pat. No. 3,830,552, which is a division of Ser. No. 238,264, March 27, 1972, Pat. No. 3,804,472.

[52] U.S. Cl. .................... 308/9; 308/72; 308/73; 308/122; 308/160
[51] Int. Cl.² .................. F16C 7/04; F16C 19/04; F16C 27/00; F16C 1706
[58] Field of Search ......... 308/72, 73, 78, 121, 122, 308/240, 9, 160

[56] References Cited
UNITED STATES PATENTS

| 736,136 | 8/1903 | McFarland, Jr. | 308/73 X |
| 2,348,928 | 5/1944 | Sampatacos | 308/73 |
| 2,424,028 | 7/1947 | Haeberlein | 308/73 |
| 2,936,197 | 5/1960 | Weiler | 308/73 |
| 3,804,472 | 4/1974 | Schuller et al. | 308/73 |
| 3,830,552 | 8/1974 | Schuller et al. | 308/121 |

Primary Examiner—Lloyd L. King
Assistant Examiner—Howard Beltran
Attorney, Agent, or Firm—N. T. Musial; G. E. Shook; John R. Manning

[57] ABSTRACT

A plurality of bearing sectors are mounted on a housing. The sectors function as lobed areas in the bearing to obtain the required lubricant film geometry. Each sector has a pad flexibly mounted on a base with a thin neck which forms a pivot.

4 Claims, 2 Drawing Figures

FLUID JOURNAL BEARINGS

ORIGIN OF THE INVENTION

The invention described herein was made by employees of the United States Government and may be manufactured and used by or for the Government for governmental purposes without the payment of any royalties thereon or therefor.

RELATED APPLICATION

This application is a division of application Ser. No. 346,483, filed Mar. 30, 1973 and now U.S. Pat. No. 3,830,552, issued Aug. 20, 1974, which is a division of application Ser. No. 238,264, filed March 27, 1972, and now U.S. Patent No. 3,804,472, issued April 16, 1974.

BACKGROUND OF THE INVENTION

This invention is concerned with the instability of zero or lightly loaded shafts when they rotate at high speeds in bearings in low viscosity lubricants. This instability refers to a self-excited fractional-frequency whirl or tendency of the shaft center to orbit the bearing center at an angular velocity about half that of the shaft around its own center.

This tendency of lightly loaded rotors running at high speeds to orbit or whirl about the bearing center is caused by a film force component acting at right angles to the bearing attitude which predominates under light or zero load conditions. This self-excited instability produces an outward spiraling of the rotor when the speed is increased. Destructive seizure may result if the rotor contacts the bearing.

The successful operation of a power generation system for space vehicles depends upon the ability of a journal bearing to inhibit this instability. Tilting pad bearings have been proposed for such applications because these bearings are exceptionally stable. However, tilting pad bearings are complex in that they contain several parts and may be subject to pivot surface damage.

SUMMARY OF THE INVENTION

These problems have been overcome by utilizing bearings constructed in accordance with the present invention. Each bearing is of fixed geometry and utilizes a plurality of sectors to provide lobed areas which function as a pump when the rotor turns. The resulting pressure distribution is similar to that obtained in a hydrostatic gas bearing.

The geometry of the lubricant film depends on the configuration of the sectors. A converging-diverging film geometry results when the minimum radial clearance is located in a centrally disposed portion of each sector.

OBJECTS OF THE INVENTION

It is, therefore, an object of the present invention to provide an improved journal bearing which may be constructed without expensive and complicated machining procedures.

A further object of the invention is to provide an improved journal bearing having lobed sectors which produce a converging-diverging film geometry.

Another object of the invention is to provide an inexpensive bearing having improved stability and simplified damping.

These and other objects of the invention will be apparent from the specification which follows and from the drawings wherein like numerals are used throughout to identify like parts.

DESCRIPTION OF THE DRAWINGS

Referring now to the drawings.

DESCRIPTION OF THE PREFERRED EMBODIMENT

Figure 1:
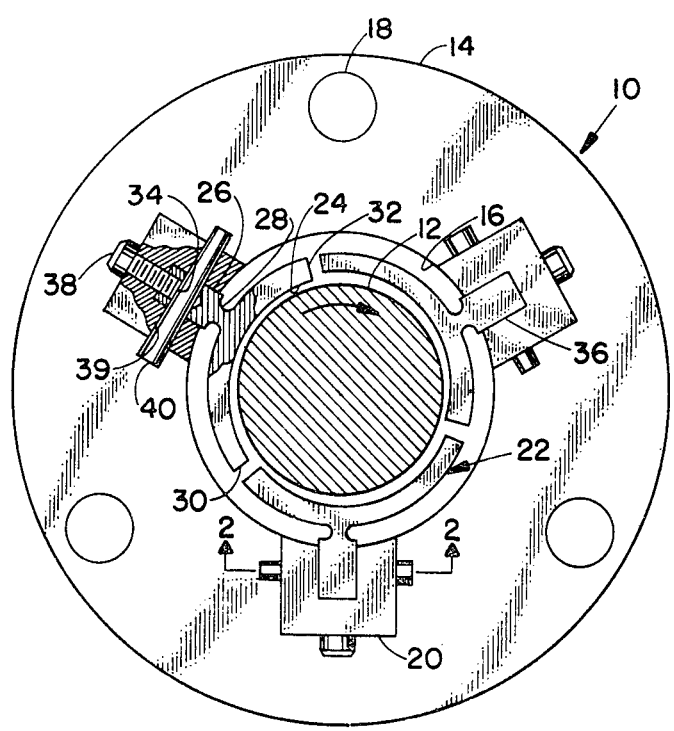
FIG. 1 is a plan view with parts in section of a bearing constructed in accordance with the present invention.

Referring now to the drawings, there is shown in FIG. 1 a bearing 10 constructed in accordance with the present invention which produces a converging-diverging film geometry. A lightly loaded shaft 12 rotates at high speed in the bearing 10 in a clockwise direction as indicated by the arrow. This shaft may operate stably at speeds as high as 9000 rpm under a very light or zero load in low viscosity fluids such as water.

The bearing 10 comprises a housing in the form of a circular plate 14 having a bore 16 extending along the bearing axis for receiving the shaft 12. Suitable holes 18 are provided in the plate 14 for rigidly mounting the bearing and maintaining it in a stationary position as the shaft 12 rotates.

Figure 2:
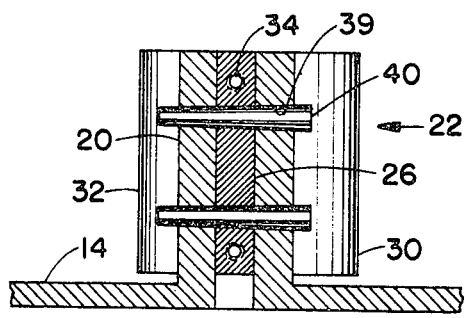
FIG. 2 is a section view taken along the line FIG. 2—2 in FIG. 1.

A plurality of rigid posts 20 extend outward from the plate 14 along the shaft 12 as shown in FIGS. 1 and 2. These posts are equally spaced about the bore 16.

According to the present invention a plurality of sectors 22 are mounted on the posts 20 as shown in FIGS. 1 and 2. Each sector 22 comprises a pad 24 flexibly mounted to a base 26 with a neck 28 having reduced thickness. In this manner the neck 28 forms a flexure point for the pad 24 between its leading edge 30 and trailing edge 32.

The minimum radial clearance between the pad 24 and the shaft 12 is at the neck 28. Both the neck and the minimum radial clearance are located at a point approximately sixty percent of the sector arc length measured from the leading edge 30 of each sector.

All of the sectors 22 for each bearing 10 are preferably fabricated from a common cylinder of bearing material. The inside of this cylinder is rough bored to an inside diameter which approximates the outside diameter of the shaft 12. A plurality of holes 34 are drilled and tapped at the location of each mounting base 26.

The outside surface of the cylinder is machined to the contour of the attached sectors 22. The neck 28 of each sector 22 is machined to the desired thickness. This thickness is dependent upon the amount of flexibility desired. The cylinder is then cut into the desired number of pieces to make the sectors 22 for the bearing 10.

The base portion 26 of one sector 22 is inserted into a slot 36 in a post 20. Mounting screws 38 extend through the post 20 and are are tightened into the threaded holes 34. Taper pin holes 39 are machined, after assembly, through the post 20 and base portion 26. Taper pins 40 are then inserted through the post 20 and the base 26. These pins rigidly secure the sectors 22 in the bearing 10.

The surface of the pad 24 is then ground to a radius greater than that of the shaft 12 with its center offset a predetermined amount in a direction away from the neck 28 of the sector 22. Minimum radial clearance at the neck 28 is achieved by maintaining the axis of the grinding wheel on a line passing through the center of the bearing 10 and the base 26. After each sector 22 has been individually finish-ground, all the sectors are rigidly mounted in the bearing housing. While the preferred embodiments of the invention have been shown and described it will be appreciated that other structural modifications may be made without departing from the spirit of the invention or the scope of the subjoined claims.

What is claimed is:

1. In combination with a lightly loaded shaft rotating at high speed having a film of lubricants thereon, and improved bearing comprising
   a housing having a bore extending therethrough for receiving said shaft,
   a plurality of sectors positioned around said shaft forming lobes for shaping the geometry of said film, each of said sectors comprising
   a base portion, and
   a pad portion flexibly mounted on said base portion at a neck, said pad portion having a partial cylindrical configuration with a radius greater than that of said shaft thereby forming a first surface facing said shaft and spaced therefrom varying distances so that the film geometry converges and diverges, said pad portion having a trailing edge at the end thereof in the direction of rotation of said shaft and a leading edge at the end in the direction opposite the rotation of said shaft, said neck being located between said trailing edge and said leading edge of said pad portion to form a flexure point therefor, and
   means for securing the base portion of each of said sectors to said housing and maintaining the same spaced from adjacent sectors about said shaft.

2. Apparatus as claimed in claim 1 wherein the neck is between the center of the pad portion and the trailing edge thereof.

3. Apparatus as claimed in claim 1 including a plurality of rigid members equally spaced around said base and extending outwardly therefrom along said shaft, and
   means for attaching said base portions to said members.

4. Apparatus as claimed in claim 6 wherein the base portions are removably secured to said members.

* * * * *

UNITED STATES PATENT OFFICE
CERTIFICATE OF CORRECTION

PATENT NO. : 3,926,482

DATED : December 16, 1975

INVENTOR(S) : FREDERICK T. SCHULLER AND WARREN A. MOORE

It is certified that error appears in the above-identified patent and that said Letters Patent are hereby corrected as shown below:

Claim 4, line 1, cancel "6" and insert --3--.

Signed and Sealed this
fifteenth Day of June 1976

[SEAL]

Attest:

RUTH C. MASON
Attesting Officer

C. MARSHALL DANN
Commissioner of Patents and Trademarks